(12) United States Patent
Kusens et al.

(10) Patent No.: US 10,292,051 B2
(45) Date of Patent: *May 14, 2019

(54) SYSTEM AND METHOD FOR PREVENTING UNAUTHORIZED ACCESS TO RESTRICTED COMPUTER SYSTEMS

(71) Applicant: COLLATERAL OPPORTUNITIES, LLC, Wilmington, DE (US)

(72) Inventors: Bruce Howard Kusens, North Miami Beach, FL (US); Michael Kusens, Cooper City, FL (US)

(73) Assignee: COLLATERAL OPPORTUNITIES, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,522

(22) Filed: Dec. 12, 2017

(65) Prior Publication Data

US 2018/0167816 A1 Jun. 14, 2018

Related U.S. Application Data

(63) Continuation-in-part of application No. 14/974,950, filed on Dec. 18, 2015, now Pat. No. 9,871,780.

(Continued)

(51) Int. Cl.
*H04L 29/06* (2006.01)
*H04W 12/08* (2009.01)
(Continued)

(52) U.S. Cl.
CPC .......... *H04W 12/08* (2013.01); *G06F 21/60* (2013.01); *G06F 21/604* (2013.01); *G06F 21/62* (2013.01);
(Continued)

(58) Field of Classification Search
CPC ....... H04W 12/08; H04W 4/80; H04W 12/12; H04W 12/06; H04L 63/0853;
(Continued)

(56) References Cited

U.S. PATENT DOCUMENTS 7,257,374 B1 * 8/2007 Creigh ..................... H04M 1/67
455/41.2
8,467,770 B1 * 6/2013 Ben Ayed ............. H04L 63/107
455/411

(Continued)

*Primary Examiner* — Chau Le
(74) *Attorney, Agent, or Firm* — Daniel S. Polley, P.A.

(57) ABSTRACT

A method and system for automatically terminating access or initiating a logout session for a restricted access system by determining that an authorized user has left the vicinity of the restricted access system. The authorized user preferably carries a wireless transmitter which transmits an authorization signal. When the authorized user leaves the vicinity of the restricted access system after logging in, the signal is no longer received by a wireless receiver or too weak of a signal, such that an access control system in communication with the wireless receiver automatically causes the restricted access system to initiate a logout action in order to prevent or reduce the chance of an unauthorized user gaining access to the restricted access system. In one embodiment the signal strength from the authorization signal at the time of logon is used as a baseline signal strength for future calculations that determine when to initiate an automatic termination of access to the restricted access system.

20 Claims, 5 Drawing Sheets

Related U.S. Application Data

(60) Provisional application No. 62/102,955, filed on Jan. 13, 2015.

(51) Int. Cl.
   *G06F 21/62* (2013.01)
   *G06F 21/60* (2013.01)
   *H04W 12/12* (2009.01)
   *H04W 4/80* (2018.01)
   *H04W 12/06* (2009.01)

(52) U.S. Cl.
   CPC ...... *G06F 21/6218* (2013.01); *H04L 63/0853* (2013.01); *H04L 63/0861* (2013.01); *H04L 63/107* (2013.01); *H04W 12/12* (2013.01); *H04W 4/80* (2018.02); *H04W 12/06* (2013.01)

(58) Field of Classification Search
   CPC ... H04L 63/0861; H04L 63/107; G06F 21/60; G06F 21/62; G06F 21/604; G06F 21/6218
   See application file for complete search history.

(56) References Cited

U.S. PATENT DOCUMENTS

| | | | | |
|---|---|---|---|---|
| 8,948,790 | B1* | 2/2015 | Kim | H04W 4/80 455/456.4 |
| 9,372,252 | B2* | 6/2016 | Larose | G01S 5/06 |
| 2002/0065625 | A1* | 5/2002 | Xydis | G06F 21/35 702/127 |
| 2004/0024749 | A1* | 2/2004 | Kusens | G06F 19/328 |
| 2006/0133612 | A1* | 6/2006 | Abedi | H04K 1/00 380/270 |
| 2012/0268241 | A1* | 10/2012 | Hanna | G06F 21/32 340/5.52 |
| 2014/0210660 | A1* | 7/2014 | Larose | G01S 13/08 342/146 |
| 2014/0379273 | A1* | 12/2014 | Petisce | A61B 5/14532 702/19 |
| 2015/0113621 | A1* | 4/2015 | Glickfield | H04L 63/08 726/7 |
| 2015/0223891 | A1* | 8/2015 | Miller | A61B 5/1171 726/19 |
| 2015/0264573 | A1* | 9/2015 | Giordano | H04L 63/08 726/7 |
| 2016/0080921 | A1* | 3/2016 | Yadav | H04W 4/023 455/404.2 |

* cited by examiner

SYSTEM AND METHOD FOR PREVENTING UNAUTHORIZED ACCESS TO RESTRICTED COMPUTER SYSTEMS

This application is a continuation-in-part of U.S. application Ser. No. 14/974,950, filed Dec. 18, 2015, which application claims the benefit of and priority to U.S. Provisional Patent Application Ser. No. 62/102,955, filed Jan. 13, 2015. All applications are incorporated by reference in their entireties for all purposes.

FIELD OF THE DISCLOSURE

The present disclosure relates generally to access to restricted computer systems and terminals and more specifically to a system and method for prevent unauthorized access to a logged in restricted computer system or terminal where an authorized user has left the area of the restricted computer system or terminal.

BACKGROUND

Information security is a high priority in today's modern society. System administrators use an array of security measures to prevent unauthorized access to computer systems and terminals. Security measures vary in complexity and effectiveness, ranging from simple usernames and passwords to biometrics, fingerprint and retinal scanners, or combinations of these and more advanced systems. However, even the most secure systems can be vulnerable to tailgating.

Tailgating occurs when an unauthorized person uses an access terminal where an authorized user is logged in. Tailgating is a significant security concern because once an authorized user logs in, most computer systems have no means to differentiate between that authorized user and an unauthorized user who subsequently uses the terminal. If an authorized user forgets to log out, or for example momentarily steps away from a terminal without logging out, an unauthorized person can take the place of the authorized user at the terminal and circumvent the majority of security measures designed to prevent unauthorized system access.

It is to addressing or reducing these problems that the current disclosed embodiments are directed.

SUMMARY OF THE DISCLOSURE

A method and system are described that uses wireless transmitters and receivers to allow a computer system to identify when an authorized user has left the vicinity of an access terminal in order to automatically terminate that user's session, thus preventing unauthorized persons from accessing secured systems.

The following definitions are provided for a better understanding of the disclosure:

| | |
|---|---|
| Access Control File | An electronic file maintained by the system administrator which contains all valid login credentials and their associated authentication signals. |
| Access Control System | An electronic security system which identifies and authenticates users, and limits access to restricted access systems. |
| Access Terminal | A physical terminal where a restricted access system can be accessed. |
| Authentication Signal | A code or signal broadcasted by a wireless transmitter unique to and/or associated with an authorized user. |
| Authorized User | A person who is permitted to access a restricted access system. This may include, but is not limited to, read/write access to these systems and/or download ability. |
| Baseline Signal Strength | A signal strength value of the authentication signal broadcasted by an authorized user's wireless transmitter and received by a wireless receiver at the time the authorized user enters login credentials at an access terminal. |
| Computer System | A computer or network of computers along with any connected hardware, software, or other devices necessary to operate the computer(s). |
| Configurable Signal Strength Threshold | A minimum signal strength broadcasted by the wireless transmitter and received by the wireless receiver below which the authorized user is considered to be away from the immediate proximity of the access terminal that the authorized user used to log into the restricted access system. |
| Configurable Time Threshold | A maximum amount of time an authorized user may be away from the proximity of an access terminal before the login session is automatically terminated by the access control system. |
| Login Credentials | What a user must know or possess in order to gain entry to a restricted access system. Non-limiting examples, include, but are not limited to: usernames, passwords, fingerprints, retinal scans, swipe cards, badges, bar codes, and other methods of authentication. One or more of these login credentials can be used by the access control system to identify and authenticate authorized users and allow or deny access. |
| Login | The use of login credentials by an authorized user that are necessary to access a restricted access system |
| Login Session | A period of activity during which an authorized user is logged in, which is ended when either the user logs out or is automatically logged out of a system. |
| Restricted Access System | A computer system secured by an access control system in order to limit who may access the system. |
| System Administrator | The person(s) responsible for the security of a computer system. |
| Tailgating | When an unauthorized person accesses a restricted access system by using a terminal which an authorized user is logged into. |

| | |
|---|---|
| Terminal | Any device used to access a restricted access system. |
| Wireless Receiver | A device which detects or receives signals or transmissions (or the absence of signals) from the Wireless Transmitter. Signals or transmissions received by this device can be provided to the access control system in order to measure the strength of a signal in order to determine the proximity of a wireless transmitter. Alternatively, the wireless receiver can be provided with hardware/software, electronics, circuitry, technology, etc. to make the signal strength determination on its own. The wireless receiver is in electrical communication with the access control system and either forwards the received signal or transmissions and/or any determinations it makes on its own to the access control system for further processing. |
| Wireless Transmitter | A device which transmits a code or signal unique to an authorized user. The method of transmission can include, but is not limited to, Bluetooth and other long or short-range frequencies transmission techniques now known or later developed. |

DETAILED DESCRIPTION

Figure 1:
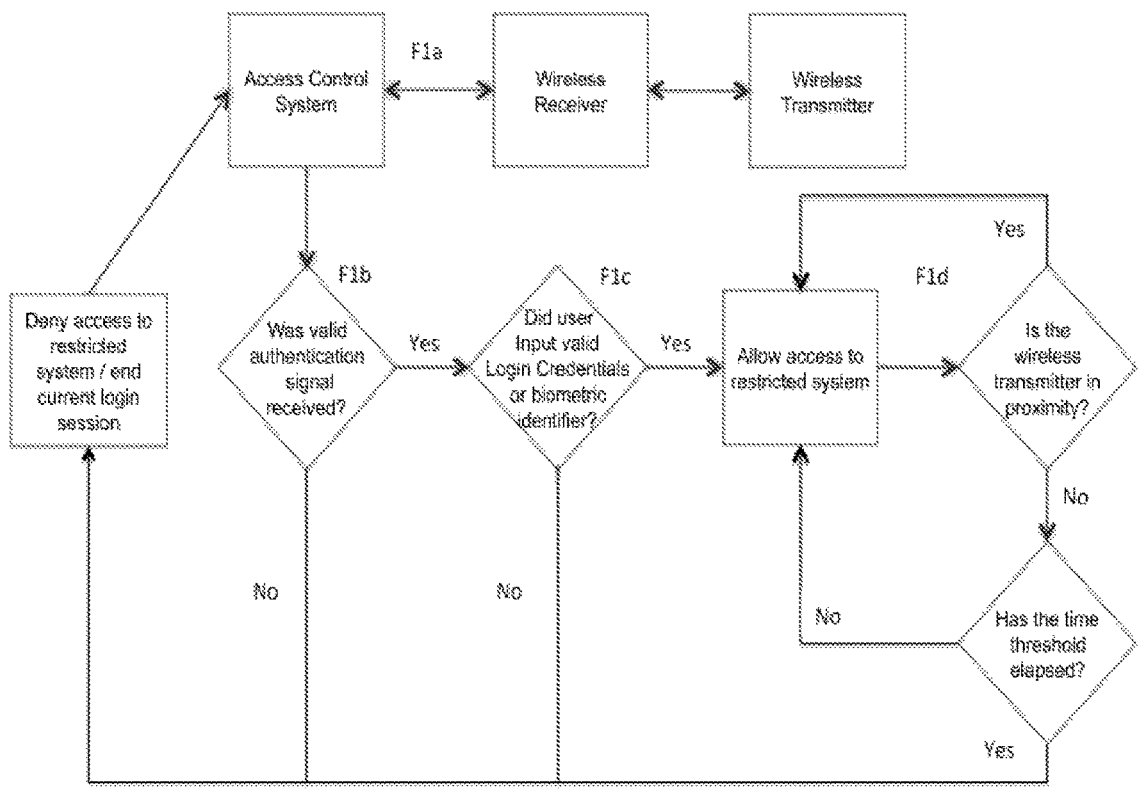
FIG. 1 is a combination block diagram and process flow chart illustrating the use of a wireless transmitter in communication with an access control system to prevent or reduce unauthorized access to an associated restricted access system in accordance with the present disclosure.

FIG. 1 illustrates one embodiment for using a wireless transmitter in communication with an access control system to prevent or reduce unauthorized access to restricted access systems.

At F1a, an access control file of the access control system retains and/or contains the records of authorized users and their associated credentials and authentication signals. All authorized users can preferably posses a small wireless transmitter constantly transmitting an authentication signal through short or long-range frequencies. Alternatively, the user's cell phone or other electronic device can be programmed to transmit the authentication signal, such as through an app downloaded onto the cell phone or electronic device. The access control system is connected to or otherwise in communication with a wireless receiver programmed to receive these authentication signals.

At F1b, to log into a secured system, such as a restricted access system, an authorized user enters his or her credentials at an access terminal. If the credentials are valid, then the login process continues. If the login credentials are invalid, the login process is terminated and access to the system is denied by the access control system.

At F1c, if an authorized user enters valid login credentials, preferably he or she will only be permitted to access the restricted access system if the wireless receiver detects that user's authentication signal transmitted from the wireless transmitter matches the authentication id associated with the user who entered valid login credentials and/or is above the configurable, predetermined and/or preprogrammed signal strength threshold programmed in the access control system. If the authentication signal is not received, or is below the strength threshold, and/or is not a proper match then the login process is terminated by the access control system and access to the restricted access system is denied.

At F1d, once an authorized user is logged in, if the authentication signal's strength drops below the configurable signal strength threshold and also preferably drops for longer than a configurable, predetermined and/or preprogrammed time threshold programmed in the access control system, the user's login session can be terminated by the access control system and he or she must log in again using the steps described above.

Figure 2:
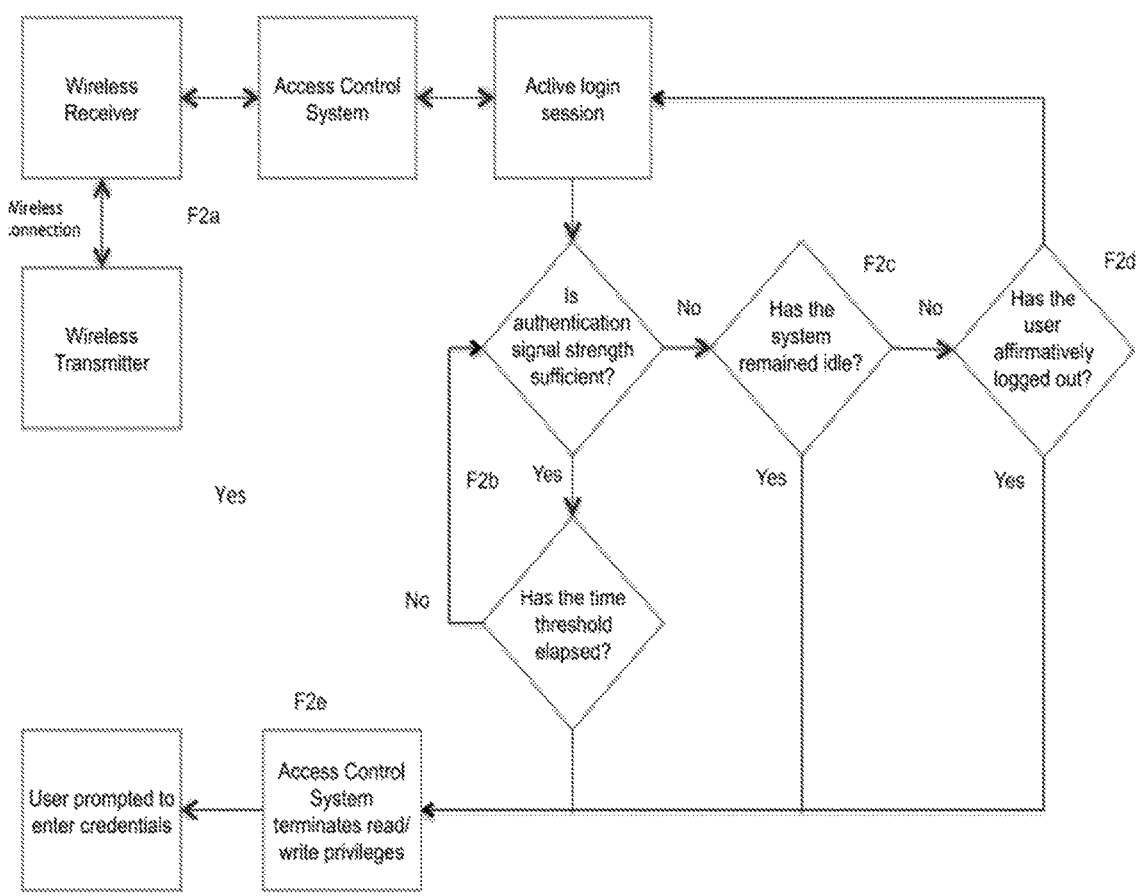
FIG. 2 is a combination block diagram and process flow chart illustrating the automatic termination of access to a restricted access system in view of a failure to receive any signal or a strong enough signal from a wireless transmitter in communication with an access control system in accordance with the present disclosure.

FIG. 2 illustrates one embodiment for automatically terminating access to a restricted access system in view of a failure to receive any signal or a strong enough signal from a wireless transmitter in communication with an access control system. Thus, FIG. 2 shows the workflow for automatically terminating an active login session based on failing to receive any signal or a strong enough signal from a wireless transmitter in communication with an access control system.

At F2a and as described in FIG. 1, an access control file of the access control system retains the records of authorized users and their associated credentials and authentication signals. All authorized users can preferably posses a small wireless transmitter constantly transmitting an authentication signal through short or long-range frequencies. Alternatively, the authorized user's cell phone or other electronic device can be programmed to transmit the authentication signal associated with the authorized user, such as through an app downloaded onto the cell phone or electronic device. The access control system can be connected to or otherwise in communication with a wireless receiver programmed to receive these authentication signals.

At step F2b, an active login session can be terminated through three preferred non-limiting methods/conditions. First, the access control system will automatically sign an authorized user off when they leave a configurable area around the device and also preferably, though not limiting, for a configurable length of time. If the wireless receiver detects that the authorized user's authentication signal transmitted from the wireless transmitter is below the configurable, predetermined and/or preprogrammed signal strength threshold programmed in the access control system for longer than the configurable or predetermined or preprogrammed time threshold programmed in the access control system, the authorized user's login session is terminated and he or she must log in again using the steps described in FIG. 1. The termination procedure is described in F2e.

At F2c, the second method by which an active login session can be terminated is through user inactivity. If the authorized user does not enter any commands into the access terminal for a configurable, predetermine and/or preprogrammed length of time, the access control system can terminate the authorized user's login session and he or she must log in again using the steps described in FIG. 1. The termination procedure is described in F2e.

At F2d, another method by which an active login session can be terminated is through an affirmative step taken by the authorized user. Non-limiting examples, include, but are not limited to: clicking a sign-off button on the access terminal, typing a sign-off command into the access terminal, tapping an RFID badge, and other methods of logging out.

One or more of these termination or sign-out procedures can be available for use with the disclosed embodiments at the same time.

One or more of these termination or sign-out procedures allow the access control system to terminate the authorized user access to a secured access system.

At F2e, if any of the logout procedures described in F2b-F2d occur, the access control system terminates all read/write access to the secured access system. The system can be programmed to reset such that the terminal displays a login screen for the restricted access system, and an authorized user must then enter login credentials to gain or regain access to the secured/restricted access system.

The access control system can either be a separate electronic device connected to the restricted access computer system or software (and potentially hardware) installed directly on the restricted access computer system. In the separate electronic device scenario/configuration, the access control system can connect to the restricted access computer system via network (TCPIP), wireless (NFC/BLE/Etc.) or physical cable connection (USB/Serial/Parallel/Thunderbolt/Etc.). For the integrated scenario, the access control system software can be installed on the restricted access computer system and possibly include some hardware such as, but not limited to, a wireless receiver dongle or card.

The access control system can perform the automatic logout processes in one of several different ways, which include, without limitation:

1. Electronically and automatically sending a signal/command to the restricted access control system to initiate a logout (i.e. send a remote command to login/logout through the operating system command capabilities such as, but not limited to, "logoff \[/n\] \[/f\]" or "logoff.vbs/s<servername>/u<username>/w<password>/f");

2. Electronically and automatically executing a script on the restricted access computer system to allow for login/logout (i.e. a preprogrammed macro, batch file or exe to perform the logout action); or 3. Electronically and automatically initiate a login event on a different restricted access computer system (or its own built in system), thus terminating the other session by way of network security protocols that only allow a single sign-in at a time on networked computers.

Figure 3:
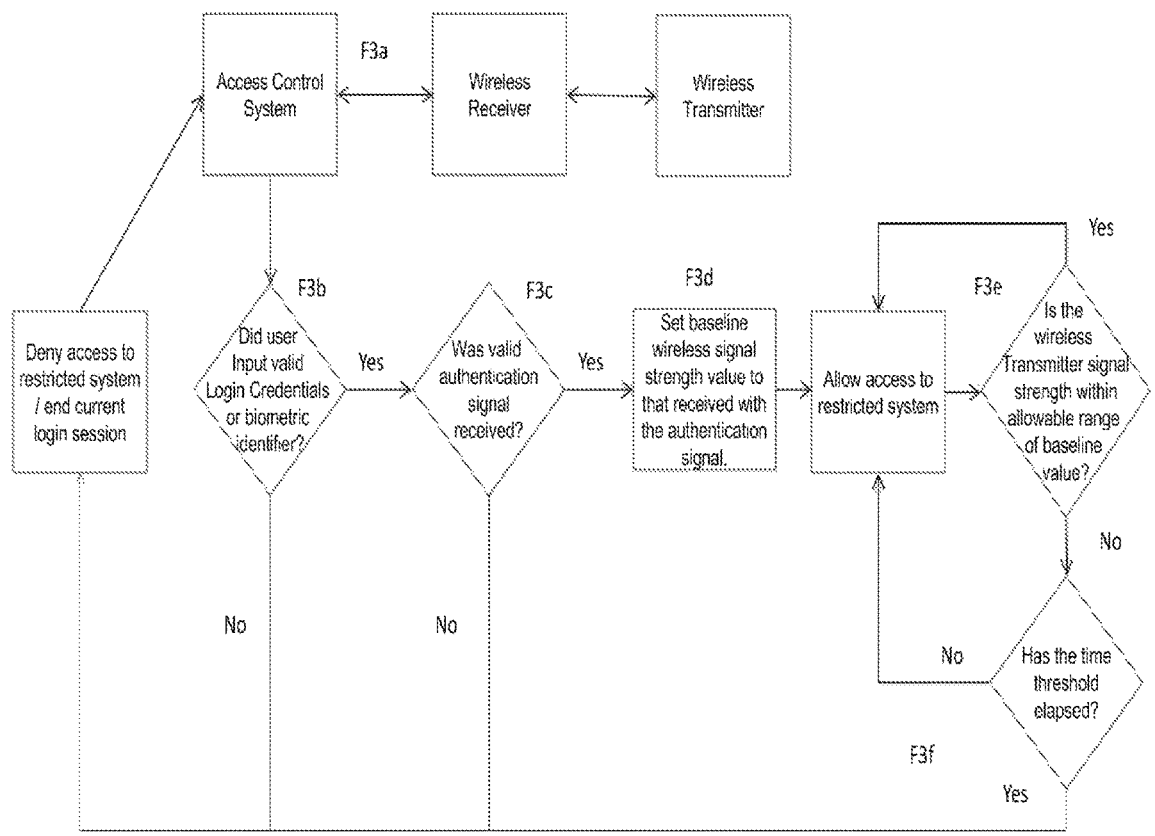
FIG. 3 is a combination block diagram and process flow chart illustrating another embodiment for the use of a wireless transmitter in communication with an access control system to prevent or reduce unauthorized access to an associated restricted access system in accordance with the present disclosure.

FIG. 3 illustrates another embodiment for using a wireless transmitter in communication with an access control system to prevent or reduce unauthorized access to restricted access systems. Thus, in FIG. 3 an additional embodiment of the workflow for utilizing a wireless transmitter in communication with an access control system to prevent or reduce unauthorized access to restricted access computer systems is provided.

At F3a, an access control file of the access control system retains and/or contains the records of authorized users and their associated credentials and authentication signals. All authorized users preferably posses a small wireless transmitter constantly transmitting an authentication signal through short or long-range frequencies. Alternatively, the user's cell phone or other electronic device can be programmed to transmit the authentication signal, such as through an app downloaded onto the cell phone or electronic device. The access control system is connected to or otherwise in communication with a wireless receiver programmed to receive these authentication signals.

At F3b, to log into a secured system, such as a restricted access system, an authorized user enters his or her credentials at an access terminal. If the credentials are valid, then the login process continues. If the login credentials are invalid, the login process is terminated and access to the system is denied by the access control system.

At F3c, if an authorized user enters valid login credentials, preferably he or she will only be permitted to access the restricted access system if the wireless receiver detects that user's authentication signal transmitted from the wireless transmitter matches the authentication id associated with the user who entered valid login credentials. If the authentication signal is not received, or is below the strength threshold, and/or is not a proper match then the login process is terminated by the access control system and access to the restricted access system is denied.

At F3d, if an authorized user's authentication signal is received and matches the authentication id associated with the users entered login credentials, the access control system records the signal strength of the authentication signal at the time the login credentials are entered as a baseline signal strength.

At F3e, once an authorized user is logged in, if the authentication signal's strength drops below a configurable, predetermined and/or preprogrammed value or range threshold and/or percentage of related to the recorded baseline signal strength and also preferably drops for longer than a configurable, predetermined and/or preprogrammed time threshold programmed in the access control system, the user's login session can be terminated by the access control system and he or she must log in again using the steps described above.

Figure 4:
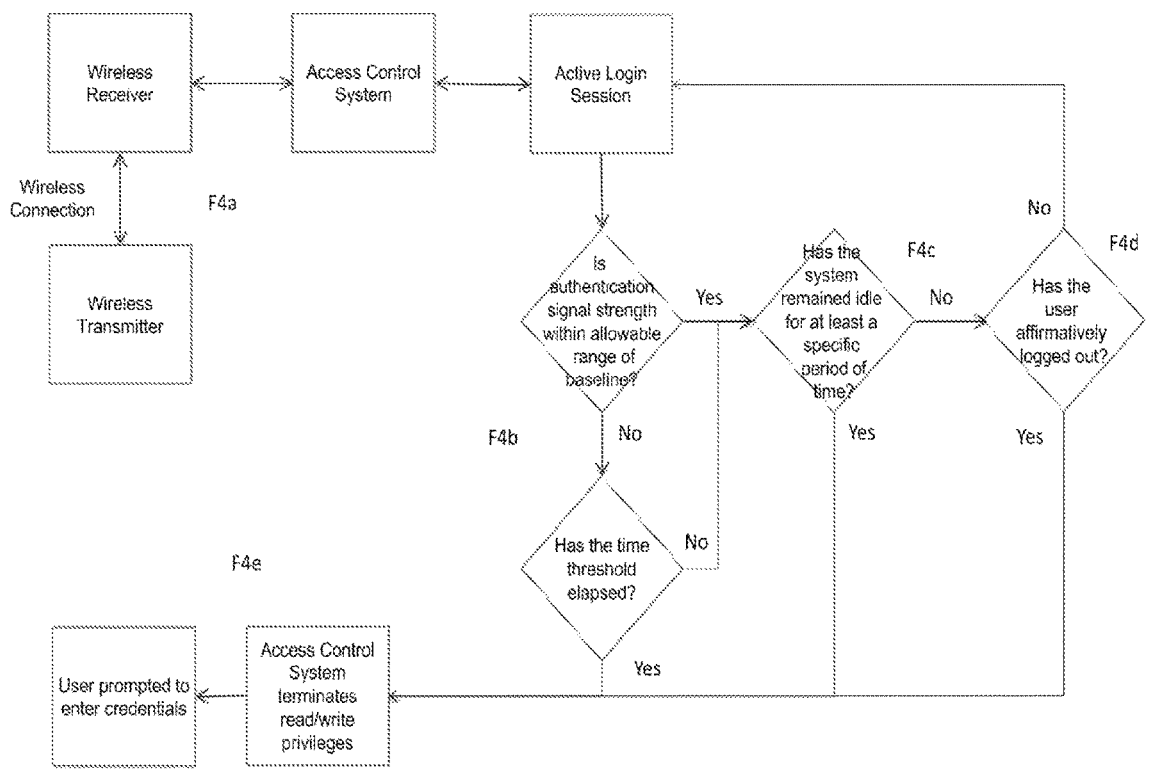
FIG. 4 is a combination block diagram and process flow chart illustrating another embodiment for automatic termination of access to a restricted access system in view of a failure to receive any signal or a strong enough signal from a wireless transmitter in communication with an access control system in accordance with the present disclosure and FIG. 5 is a block diagram of the primary components for a preferred embodiment for the system of the present disclosure that can be used in practicing the disclosed method and also illustrates such components can communicate with each other in one non-limiting embodiment.

FIG. 4 illustrates an embodiment for automatically terminating access to a restricted access system in view of a failure to receive any signal or a strong enough signal from a wireless transmitter in communication with an access control system. Thus, in FIG. 4 one embodiment for the workflow for automatically terminating an active login session based on failing to receive any signal or a strong enough signal from a wireless transmitter in communication with an access control system.

At F4a and as described in FIG. 3, an access control file of the access control system retains the records of authorized users and their associated credentials and authentication signals. All authorized users can preferably posses a small wireless transmitter constantly transmitting an authentication signal through short or long-range frequencies. Alternatively, the authorized user's cell phone or other electronic device can be programmed to transmit the authentication signal associated with the authorized user, such as through an app downloaded onto the cell phone or electronic device. The access control system is connected to or otherwise in communication with a wireless receiver programmed to receive these authentication signals.

At step F4b, an active login session can be terminated through three preferred non-limiting methods/conditions. First, the access control system will automatically sign an authorized user off when they leave a configurable area around the device and also preferably, though not limiting, for a configurable length of time. If the wireless receiver detects that the authorized user's authentication signal transmitted from the wireless transmitter drops below a configurable, predetermined and/or preprogrammed value or range threshold or percentage of related to the recorded baseline signal strength and also preferably drops for longer than a configurable, predetermined and/or preprogrammed time threshold programmed in the access control system, the user's login session can be terminated by the access control system and he or she must log in again using the steps described in FIG. 3. The termination procedure is described in F4e.

At F4c, the second method by which an active login session can be terminated is through user inactivity. If the authorized user does not enter any commands into the access terminal for a configurable, predetermined and/or preprogrammed length of time, the access control system can terminate the authorized user's login session and he or she must log in again using the steps described in FIG. 3. The termination procedure is described in F4e.

At F4d, another method by which an active login session can be terminated is through an affirmative step taken by the authorized user. Non-limiting examples, include, but are not limited to: clicking a sign-off button on the access terminal, typing a sign-off command into the access terminal, tapping an RFID badge, and other methods of logging out.

One or more of these termination or sign-out procedures can be available for use with the disclosed embodiments at the same time.

One or more of these termination or sign-out procedures allow the access control system to terminate the authorized user access to a secured access system.

At F4e, if any of the logout procedures described in F4b-F4d occur, the access control system terminates all read/write access to the secured access system. The system can be programmed to reset such that the terminal displays a login screen for the restricted access system, and an authorized user must then enter login credentials to gain or regain access to the secured/restricted access system.

The access control system can either be a separate electronic device connected to the restricted access computer system or software (and potentially hardware) installed directly on the restricted access computer system. In the separate electronic device scenario/configuration, the access control system can connect to the restricted access computer system via network (TCPIP), wireless (NFC/BLE/Etc.) or physical cable connection (USB/Serial/Parallel/Thunderbolt/Etc.). For the integrated scenario, the access control system software can be installed on the restricted access computer system and possibly include some hardware such as, but not limited to, a wireless receiver dongle or card.

The access control system can perform the automatic logout processes in one of several different ways, which include, without limitation:

1. Electronically and automatically sending a signal/command to the restricted access control system to initiate a logout (i.e. send a remote command to login/logout through the operating system command capabilities such as, but not limited to, "logoff \[/n\] \[/f\]" or "logoff.vbs/s<servername>/u<username>/w<password>/f");

2. Electronically and automatically executing a script on the restricted access computer system to allow for login/logout (i.e. a preprogrammed macro, batch file or exe to perform the logout action); or 3. Electronically and automatically initiate a login event on a different restricted access computer system (or its own built in system), thus terminating the other session by way of network security protocols that only allow a single sign-in at a time on networked computers.

Figure 5:
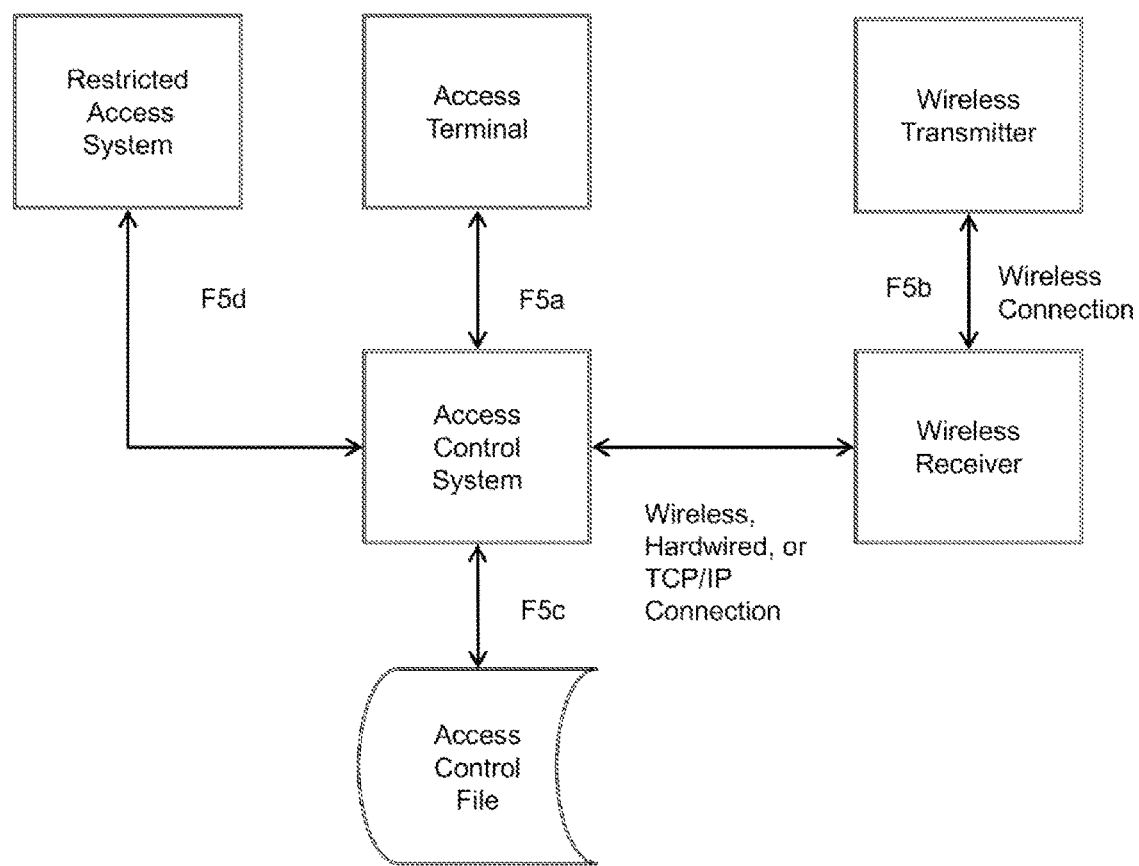

FIG. 5 illustrates the various components that can be used in practicing the above described method and how they can communicate with each other.

At F5a, the access terminal can be a physical computer or electronic device where an authorized user can access a restricted access system. A user can be prompted at the terminal for their login credentials. These credentials may include security measures such as, but not limited to, username and/or password, fingerprint and/or retinal scanners, biometrics, swipe card or badge, or any other login mechanism now developed or developed in the future.

At F5b, the access control system (or restricted access system) compares the credentials the user has inputted to those in an electronic file where credentials for authorized users are stored and maintained. If the user inputs invalid credentials, access to the system is denied. The access control system or restricted access system can be programmed to allow the user another attempt to login or can be programmed to be locked for a predetermined or preprogrammed period of time. The access control system or restricted access system can also be programmed to be locked after a certain predetermined or preprogrammed number of successive login failure attempts. The restricted access system could be programmed to handle the authorized logons, with the access control system handling automatic termination of logins when one or more of the above described conditions is(are) met. Alternatively, the access control system can be programmed to handle both authorized logging ins and automatic login terminations.

At F5c, in addition to having the proper credentials, an authorized user must have on their person their wireless transmitter broadcasting the proper authorization signal. Otherwise, the access control system will not receive the authorization signal and will initiate termination of the session. The wireless transmitter preferably continuously sends out an authentication signal unique to that user's login credentials for receipt by the wireless receiver. This signal can be broadcasted or transmitted by Bluetooth or another long or short range frequency transmission technology or by other preferably wireless transmission technology now known or later developed.

The access control system, which can be in communication with the wireless receiver, preferably does not permit an authorized user to login to the system unless the correct authentication signal for the authorized user is received by the wireless receiver and detected by the access control system.

Additionally, after a successful login, any active login session can be terminated by the access control system if the wireless receiver does not detect/receive the proper authentication signal from the wireless transmitter or if the signal strength from the wireless transmitter drops below the configurable or predetermined/preprogrammed signal strength threshold preferably for longer than the configurable or predetermined/preprogrammed time threshold. This method allows the access control system to determine that an authorized user has left the proximity of the access terminal and to automatically end that user's session if they do not return within a predetermined length of time.

At F5d. if a user enters valid login credentials, and the wireless receiver detects the requisite authorization signal's strength above the minimum threshold, then access to the restricted access system is granted. If any of these conditions are not met, then access is denied.

The access control system can also be programmed to automatically take a digital picture or video through a webcam or other digital camera at the access terminal or otherwise obtain a digital image of the individual at the access terminal, if the system detects key strokes while the signal strength is below the required predetermined threshold level but the predetermined length of time has not been reached such that the access has not yet been terminated. This feature will allow the system administrator, law enforcement, authorities, etc. to have a digital image or video of any person who was accessing the restricted access system at the access terminal while the authorized user was away but prior to the access control system automatically terminating access through the above described steps. Additionally, the actual keystrokes entered by the person can also be recorded or otherwise saved by the access control system in order to create a record of what the person was attempting to access.

Accordingly, in at least certain embodiment, a baseline single strength calculation for each login session can be used, whereas in other embodiments a predefined threshold can be used for signal strength for authentication and/or for causing an automatic logout. Though not considered limiting, the single strength calculation can be used where the authorization signal is being sent by a smart phone, as each phone manufacturer may have a different Bluetooth antennae design, the signal strength emitting from the phone may be different from one manufacturer as compared to another manufacturer. To compensate for the variations in signal strength, the system can be programed to establish, calculate, obtain, measure and/or determine (collectively "determine" or "determining") a baseline signal strength value preferably at the time the user inputs the first login credentials and the system scans for the authentication signal. Whatever that signal strength value of the authentication signal received by the wireless receiver is can then be set as the baseline and stored by the system. When it comes time to automatically logout the user, the automatic logout can happen when the signal strength drops below a percentage or absolute value from the stored baseline strength number recorded earlier, such as, but not limited to, at the time of login. As non-limiting examples:

a. If at the time of login, the authentication signal is received at a strength of 50, then that is set as the baseline. The system will then monitor the authentication signal and when it drops more than 30% from the baseline (i.e. below 35), the system will automatically logout the user preferably by one of the above-described logout methods.

b. If the authentication signal at time of login is 45 then the logout value is set to 31.5 (i.e. 30% of 45).

Using a wireless transmitter and receiver in connection with an access control system to prevent or reduce the unauthorized access to restricted computer systems will provide significant security and financial benefits incident to computer systems in all industry sectors, including the following public benefits:

a. Prevention or reduction of unauthorized access and distribution of sensitive personal, financial, medical, and other data;

b. Prevention or reduction of crimes such as data and identity theft;

c. Allow system administrators greater control over access to sensitive data;

d. Allow system administrators to better identify individuals who have accessed restricted access systems; and e. Reduce administrative time spent by system administrators and security personnel in identifying persons who have accessed restricted systems.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, passwords or authorizations, electronic storage mechanisms, etc. discussed above or shown in the drawings, if any, are merely by way of example and are not considered limiting and other component(s) and their locations, electronic communication methods, passwords or authorizations, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the system and method have been described in certain terms and have disclosed certain embodiments or modifications, persons skilled in the art who have acquainted themselves with the disclosure, will appreciate that it is not necessarily limited by such terms, nor to the specific embodiments and modification disclosed herein.

Thus, a wide variety of alternatives, suggested by the teachings herein, can be practiced without departing from the spirit of the disclosure, and rights to such alternatives are particularly reserved and considered within the scope of the disclosure.

What is claimed is:

1. A computer-implemented method for protecting a restricted access computer system from unauthorized access by automatically terminating access to the restricted access computer system which has been previously successfully logged onto by an authorized user, comprising the steps of:
   a. receiving by an electronic access control system an authentication ID signal transmitted from a wireless device as part of logging on to a restricted access computer system by an authorized user, wherein the wireless device is associated with the authorized user and the electronic access control system is in communication with the restricted access computer system;
   b. determining by the electronic access control system a signal strength for the received authentication ID signal received to be used as a baseline signal strength; and
   c. after a successful log on to the restricted access computer system by the authorized user, automatically terminating further access to the restricted access system by the electronic control access system where a current signal strength being transmitted by the wireless transmitter falls below the baseline signal strength or a predefined value derived from the baseline signal strength.

2. The computer implemented method for protecting a restricted access computer system of claim 1 wherein automatic termination in step c. also requires that the current signal strength remain below the baseline signal strength or the predefined value derived from the baseline signal strength for a predefined period of time.

3. The computer implemented method for protecting a restricted access computer system of claim 2 further comprising the step of saving the baseline signal strength and the predefined period of time in an electronic file, electronic database or electronic memory component of the electronic access control system or in communication with the electronic access control system prior to step c.

4. The computer implemented method for protecting a restricted access computer system of claim 1 further comprising the step of saving the baseline signal strength in an electronic file, electronic database or electronic memory component of the electronic access control system or in communication with the electronic access control system prior to step c.

5. The computer-implemented method for protecting a restricted access computer system of claim 1 further comprising the step, prior to step c., of confirming that the received authentication ID signal is valid prior to allowing access to the authorized user on the restricted access computer system.

6. The computer implemented method for protecting a restricted access computer system of claim 5 wherein the step of confirming that the received authentication ID signal is valid comprises the steps of (i) comparing identification information contained in the received authentication ID signal against identification information stored in an access control electronic file by the electronic access control system; and (ii) determining whether the authentication ID signal received is valid by the electronic access control system based on the comparison.

7. The computer-implemented method for protecting a restricted access computer system of claim 5 further comprising the step of denying access to the restricted access computer system prior to step c. by the electronic access control system if a valid authorized ID signal is not received by the wireless receiver as determined by the access control system.

8. The computer-implemented method for protecting a restricted access computer system of claim 1 wherein the step of automatically terminating access of step c. comprises electronically sending a signal/command by the electronic access control system to the restricted access computer system to automatically initiate a logout of the restricted access computer system.

9. The computer-implemented method for protecting a restricted access computer system of claim 1 wherein the step of automatically terminating access of step c. comprises electronically executing a script on the restricted access computer system to perform a logout action for the restricted access computer system.

10. The computer-implemented method for protecting a restricted access computer system of claim 1 wherein the restricted access system is a first of at least two restricted access systems that are networked together and wherein the step of automatically terminating access of step c. comprises electronically initiating a login event on a second restricted access system to automatically terminate the session on the first restricted access system by way of network security protocols that only allow a single sign-in at a time on the networked computers of at least two restricted access systems.

11. The computer-implemented method for protecting a restricted access computer system of claim 1 further comprising the step, prior to performing step d., of determining whether any key strokes have been performed at the access terminal where the current signal from the wireless device is below the baseline signal strength or a predefined value derived from the baseline signal strength.

12. The computer-implemented method for protecting a restricted access computer system of claim 11 further comprising the step of capturing an image or video of a person entering key strokes at an access terminal associated with the restricted access computer system where it is determined by the electronic access control system that the current signal is below the baseline signal strength or a predefined value derived from the baseline signal strength.

13. The computer-implemented method for protecting a restricted access computer system of claim 1 further comprising the step of capturing an image or video of a person entering key strokes at an access terminal associated with the restricted access computer system where the current signal is below the baseline signal strength or a predefined value derived from the baseline signal strength.

14. The computer-implemented method for protecting a restricted access computer system of claim 1 further comprising of determining that the authorized user has inputted one or more valid login credentials by the restricted access computer system or the access control system prior to allowing the authorized user to log on to the restricted access computer system.

15. The computer-implemented method for protecting a restricted access computer system of claim 14 wherein the one or more login credentials are selected from a group comprising: username, password, fingerprint scan, swipe card, badge, retinal scan or other biometric data.

16. The computer-implemented method for protecting a restricted access computer system of claim 1 wherein transmission of the authentication ID signal from the wireless device to the wireless receiver is through Bluetooth technology.

17. An electronic based system for protecting a restricted access computer system from unauthorized access by automatically terminating access to the restricted access computer system which has been previously successfully logged onto by an authorized user, said system comprising:
an electronic access control system in communication with a restricted access computer system, said electronic access control system specifically programmed to control access to the restricted access computer system and allowing access only to the authorized user;
an electronic access control file in communication with the electronic access control system, said electronic access control file containing information regarding authorized users for the restricted access computer system;
a wireless receiver in communication with the electronic access control system,
a wireless transmitter worn, carried or contained on the authorized user, the wireless transmitter separate from and not part of the restricted access computer system;
the wireless receiver in wireless communication with the wireless transmitter in order to receive signals transmitted by the wireless transmitter;
wherein at the time of logon by the authorized user he electronic access control system is programmed to determine a baseline signal strength based on a signal strength of a received authentication ID signal sent by the wireless transmitter and received by the wireless receiver;
wherein after said restricted access computer system has been logged onto by the authorized user the electronic access control system programmed to determine if a signal strength from a current signal sent from the wireless transmitter is below the baseline signal strength or a predefined value derived from the baseline signal strength.

18. The electronic based system for protecting a restricted access computer system of claim 17 wherein the electronic access control system is programmed to initiate an automatic access termination or logout of the restricted access computer system when the signal strength of the current signal is below the baseline signal strength or the predefined value derived from the baseline signal strength.

19. The electronic based system for protecting a restricted access computer system of claim 17 wherein the electronic access control system is programmed to initiate an automatic access termination or logout of the restricted access computer system when the signal strength of the current signal is below the baseline signal strength or a predefined value derived from the baseline signal strength and has remained below the baseline signal strength or the predefined value derived from the baseline signal strength for a predefined time period.

20. The electronic based system for protecting a restricted access computer system of claim 17 further comprising a camera or video camera in communication with the access control access system, said access control system programmed to active the camera or video camera when the access control system detects key strokes are being entered by a person at an access terminal associated with the restricted access computer system after the access control system has determined that the signal strength from the current signal is below the baseline signal strength or the predefined value derived from the baseline signal strength but prior to automatic termination of access to the restricted access computer system.

* * * * *